United States Patent [19]

Ohya et al.

[11] Patent Number: 4,674,292
[45] Date of Patent: Jun. 23, 1987

[54] SYSTEM FOR CONTROLLING FLOW RATE OF REFRIGERANT

[75] Inventors: Satoshi Ohya, Ohizumi; Katsuhiko Hoshi, Ohta, both of Japan

[73] Assignee: Sanyo Electric Co., Ltd., Japan

[21] Appl. No.: 757,793

[22] Filed: Jul. 22, 1985

[30] Foreign Application Priority Data

Jul. 26, 1984 [JP] Japan .............................. 156330/1984

[51] Int. Cl.$^4$ ............................................. F25B 41/04
[52] U.S. Cl. ........................................ 62/223; 62/225
[58] Field of Search ................. 62/225, 224, 223, 222, 62/204, 205, 210, 211, 212

[56] References Cited

U.S. PATENT DOCUMENTS

| | | | |
|---|---|---|---|
| 3,537,272 | 11/1970 | Hales et al. | 62/212 X |
| 3,877,243 | 4/1975 | Kramer | 62/183 X |
| 4,459,818 | 7/1984 | Kaya et al. | 62/201 |
| 4,495,779 | 1/1985 | Tanaka et al. | 62/211 |
| 4,506,518 | 3/1985 | Yoshikawa et al. | 62/204 X |
| 4,523,435 | 6/1985 | Lord | 62/212 |
| 4,523,436 | 6/1985 | Schedel et al. | 62/222 |
| 4,545,210 | 10/1985 | Lord | 62/77 |

Primary Examiner—Harry Tanner
Attorney, Agent, or Firm—Darby & Darby

[57] ABSTRACT

A system for controlling the flow rate of a refrigerant for refrigeration cycles which comprises a electronic expansion valve disposed at the inlet of an evaporator and a controller for controlling the opening-closing movement of the valve. The controller comprises a calculating unit for comparing the degree of superheat of the refrigerant measured at the evaporator with a preset degree of superheat and feeding a valve opening adjusting signal to the valve according to the value obtained by the comparison, and a valve full-closing signal generator for comparing the measured temperature of the space to be cooled with a preset temperature and feeding a valve full-closing signal to the valve based on the value obtained from the comparison of temperatures, in preference to the opening adjusting signal.

6 Claims, 8 Drawing Figures

FIG. 6
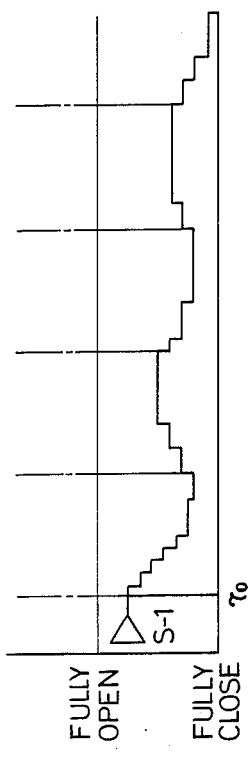
(a) OPERATION OF MOTOR-DRIVEN VALVE
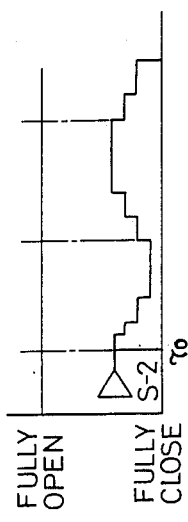
(b) OPERATION OF MOTOR-DRIVEN VALVE
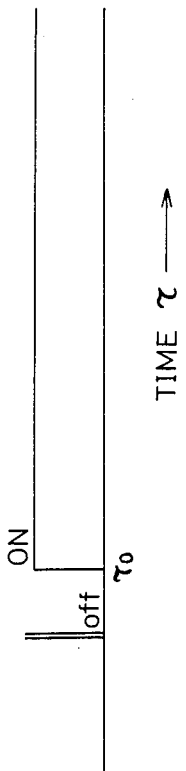
(c) POWER SUPPLY OF CONTROLLER
TIME $\tau \longrightarrow$

SYSTEM FOR CONTROLLING FLOW RATE OF REFRIGERANT

BACKGROUND OF THE INVENTION (a) Field of the Invention

The present invention relates to a system for controlling the flow rate of a refrigerant for use in air conditioners and refrigerating apparatus such as freezers, refrigerators and freezing or refrigerating showcases.

(b) Description of the Prior Art

Published Examined Japanese patent application No. SHO 58-47628and the publication "Reito (Refrigeration)," Vol. 56, No. 641 (March 1981), pp. 60–64 disclose systems which are adapted to control the flow rate of a refrigerant in refrigeration cycles and which include a thermoelectric expansion valve. With such control systems, an electic signal is produced for controlling the degree of opening of the valve in accordance with the difference between an electric signal from a first temperature sensor provided at the inlet or an intermediate portion of an evaporator for refrigeration cycles and an electric signal from a second temperature sensor provided at the outlet of the evaporator to keep the difference constant and thereby maintain the degree of superheat (the temperature at the outlet of the evaporator minus the temperature at the inlet of the evaporator) approximately at a constant value for the control of the refrigerant flow rate. In actuality, however, the range of control thus afforded is narrow because 'the rectilinear portion of the flow rate characteristics is used for the control.

Further the thermostatic expansion valve generally used in refrigerating or air conditioning apparatus is such that the gas enclosed in its heat sensitive tube is ingeniously prepared so as to maintain the evaporator at a constant degree of superheat, but the valve is still narrower than the thermoelectric valve in the range of controllable capacities.

With the prior-art technique described above, the control capacity of the thermoelectric or thermostatic expansion valve differs when different kinds of refrigerants (for example, R-12, R-22 and R-502) are used and when the size of the space to be cooled (e.g. the interior capacity of refrigerator) changes. This gives rise to the necessity of selecting a valve which is suited to the object of control, entailing the drawback of requiring a very cumbersome procedure for the selection of the valve as well as for the adjustment of opening of the valve.

The present invention has been accomplished to overcome the foregoing drawbacks of the prior art.

SUMMARY OF THE INVENTION

According to the present invention, there is provided a system for controlling the flow rate of a refrigerant for use in refrigeration cycles comprising a electronic expansion valve provided at the inlet of an evaporator, and a controller for controlling the opening-closing movement of the valve, the controller comprising (i) a valve drive unit for opening or closing the valve, (ii) a unit for measuring the degre of superheat of the evaporator, (iii) a unit for measuring the temperature of the space to be cooled by the evaporator, (iv) calculating means for feeding a valve opening adjusting signal to the valve drive unit in accordance with a value obtained by comparing the measured degree of superheat given by the superheat measuring unit with a preset degree of superheat, and (v) a valve fullclosing signal generator for feeding to the valve drive unit a valve full-closing signal in preference to the valve opening adjusting signal, in accordance with a value obtained by comparing the temperature measured by the temperature measuring unit with a preset temperature.

According to the present invention, a electronic eion valve is used as valve means for varying the flow rate of the refrigerant, and the control of superheat or the control of temperature is effected selectively as changed over under a specified condition. This makes it possible to control the superheat and the temperature independently of each other, consequently reliably preventing, for example, the return of liquid refrigerant to the compressor and excessive cooling of the space to be cooled.

A pulse-driven expansion valve incorporating a stepping motor may be used as the electronic expansion valve. This assures fine control over a wide range.

For the control of superheat according to the present invention, the measured degree of superheat is compared with the preset degree of superheat to obtain a signal representing a deviation, which is corrected by the internal algorithmic unit before the signal is fed to the valve drive unit. Accordingly a converged signal is obtained which is exclusive of the influence of disturbances, whereby the superheat is controllable stably.

Further according to the present invention, the initial degree of valve opening is determined according to the kind of refrigerant used and/or the size of the space to be cooled. This eliminates the manual procedure needed for selecting a proper expansion valve or adjusting the valve opening.

Specific technical means of the present invention will now be descibed.

To overcome the foregoing problems according to the present invention, a preset degree of superheat is compared in a first comparator with the degree of superheat measured by an evaporator temperature measuring unit to obtain a deviation signal, which is fed to an internal algorithmic unit. The internal algorithmic unit corrects the deviation by PID (proportion, integration, differentiation) operation, giving an adjusting signal to a valve drive unit, which in turn gives an electronic expansion valve a valve opening adjusting signal required for appropriate control of superheat. Further a preset temperature $T_S$ is compared with the temperature $T_M$ measured by a cooled space temperature measuring unit in a second comparator. When a temperature signal is obtained which indicates that $T_M \leq T_S$, the temperature signal is given to a valve full-closing signal generator, which in turn delivers a valve full-closing signal. This signal closes the valve, discontinuing the supply of refrigerant to the evaporator for the control of temperature. Further prior to the control of superheat and temperature, i.e. before the refrigerating apparatus concerned is brought into refrigeration operation, a refrigerant selecting circuit feeds a refrigerant specifying signal to an initial valve opening signal generator, while a load capacity selecting circuit gives the generator a load capacity signal specifyinq the size of the space to be cooled. The signal generator identifies the refrigerant to be used and the load capacity and feeds to the valve drive unit a signal indicating the initial degree of valve opening, whereby the degree to which the valve is to be opened for initiating the operation of the apparatus is determined.

These technical means have the following advantages. The degree of superheat measured by the evaporator temperature measuring unit is compared with the preset degree of superheat in the first comparator, and the resulting deviation signal is processed by the internal algorithmic unit for the correction of the deviation to obtain an adjusting signal. In response to this signal, the valve drive unit produces a valve opening adjusting signal for opening the valve, whereby the superheat can be controlled in accordance with the deviation of the superheat measurement from the preset degree of superheat. The converged pulse signal free of the influence of disturbances is continuously given to the valve to determine the degree of valve opening in conformity with the pulse signal and to assure stable control of the superheat. Further the temperature $T_M$ measured by the temperature measuring unit is compared with the preset temperature $T_S$ in the second comparator, and provided that $T_M \leq T_S$, the valve full-closing signal generator feeds a valve full-closing signal to the valve drive unit, which closes the valve. This prevents excessive cooling of the space by controlling the temperature. Moreover, the temperature is controllable by the valve independently of the control of superheat. Furthermore, the refrigerant specifying signal from the refrigerant selecting circuit and the load capacity signal from the load capacity selecting circuit are fed to the initial valve opening signal generator to obtain an initial valve opening degree signal in accordance with the kind of refrigerant and the load capacity. This gives an optimum degree, i.e. area, of opening to the valve for initiating the operation of the refrigerating apparatus.

BRIEF DESCRIPTION OF THE DRAWINGS

A refrigerant flow rate control system embodying the present invention is shown in the drawings, in which:

FIG. 6 (a) and (b) are waveform diagrams showing the initial degree of opening of the valve; and FIG. 6 (c) is a time chart showing the operation of the controller in corresponding relation to FIGS. 6 (a) and (b).

DESCRIPTION OF THE PREFERRED EMBODIMENTS

Figure 2:
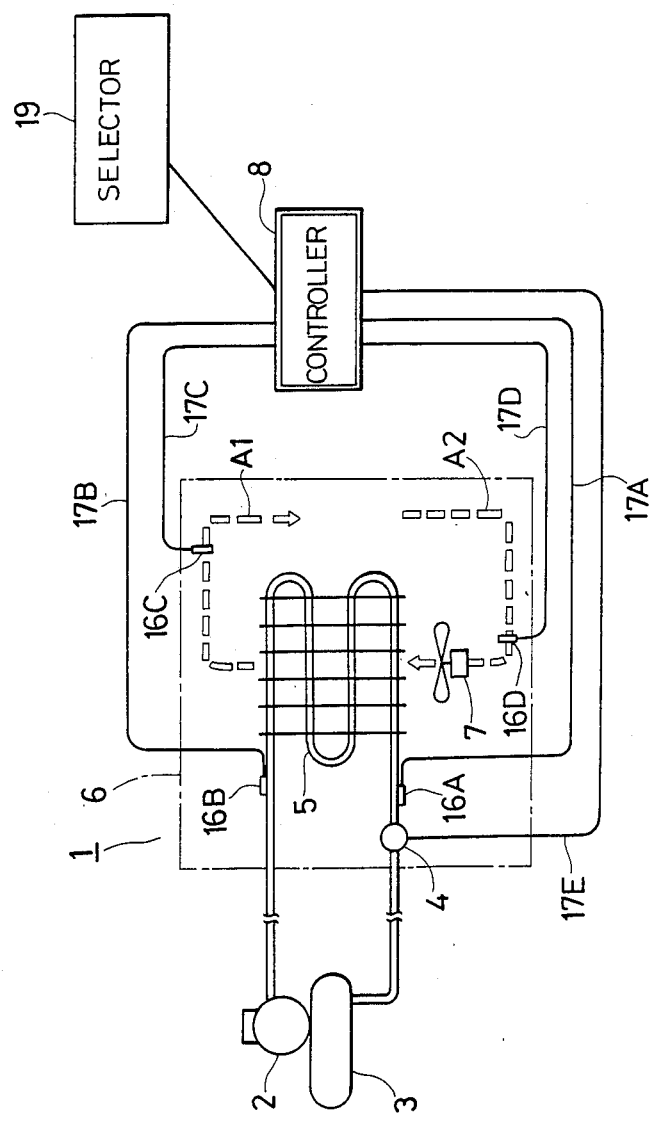
FIG. 2 is a refrigerant circuit diagram.

An embodiment of the present invention will be described below with reference to the drawings. FIG. 2 shows a refrigerating apparatus 1 (such as a freezing or refrigerating showcase) comprising an electric refrigerant compressor 2, condenser 3, electronic expansion valve 4 and evaporator 5 which are connected into a loop by piping to provide the known refrigeration cycle of compression, condensation, expansion and evaporation. Indicated at 6 by a dot-and-dash line is the space to be cooled by the cold air subjected to heat exchange by the evaporator 5. The apparatus has a fan 7 for the forced circulation of supply cold air A1 from the evaporator 5 and the return air A2 to be returned to the evaporator 5.

Figure 1:
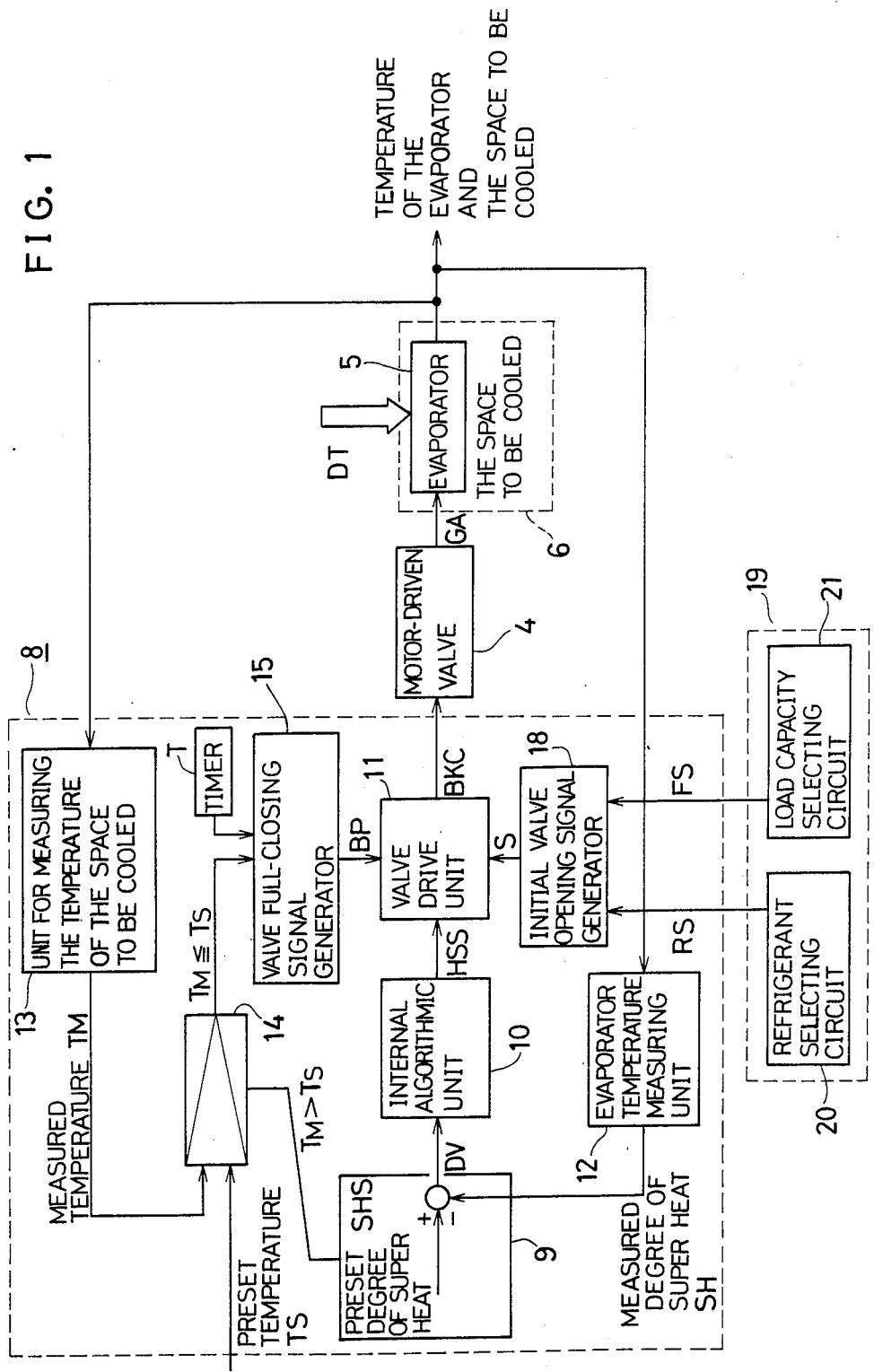
FIG. 1 is a block diagram showing a controller and a selector.

A controller 8 controls the opening-closing movement of the valve 4. As seen in FIG. 1, the controller 8 comprises a first comparator 9 for comparing a set signal corresponding to a preset degree of superheat as a target value with a feedback signal corresponding to a measured degree of superheat, an internal algorithmic unit 10 serving as means for adjusting the operation of the valve, a valve drive unit 11 serving as means for operating the valve, an evaporator temperature measuring unit 12 for measuring the temperature of the evaporator 5, a unit 13 for measuring the temperature of the space 6 to be cooled, a second comparator 14 for comparing a set signal corresponding to the temperature preset for the space 6 with a feedback signal corresponding to the measured temperature of the space 6, and a valve full-closing signal generator 15. A first sensor 16A for measuring the temperature at the inlet of the evaporator, a second sensor 16B for measuring the temperature at the outlet of the evaporator, a third sensor 16C for measuring the temperature of the supply cold air, a fourth sensor 16D for measuring the temperature of the return air, and the valve 4 are connected to the controller 8 by signal lines 17A to 17E, respectively. Further incorporated in the controller 8 is an initial valve opening signal generator 18 which gives the valve drive unit 11 an output signal specifying the degree of opening of the valve 4 when starting refrigeration cycles, in accordance with output signals from a selector 19.

Figure 4:
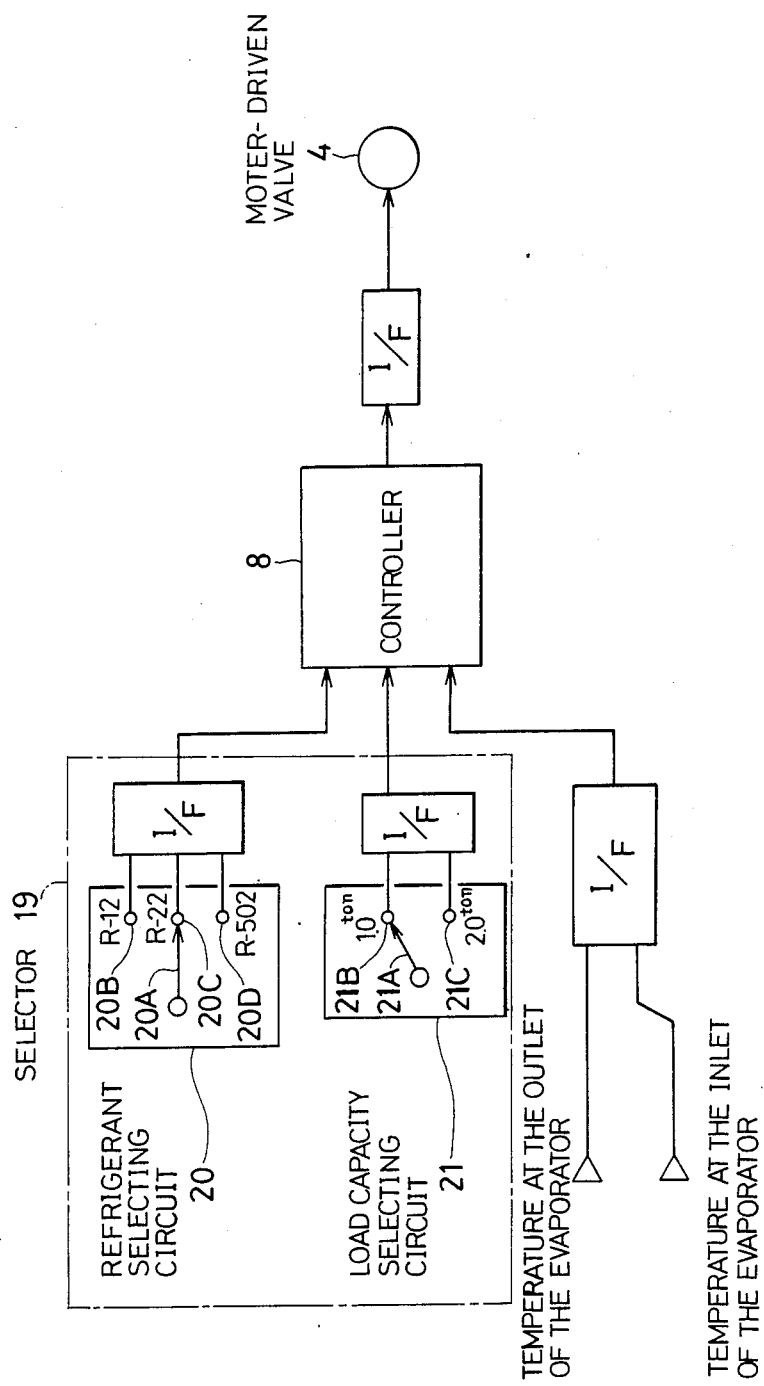
FIG. 4 is a block diagram of the selector.

The selector 19 comprises a refrigerant selecting circuit 20 and a load capacity selecting circuit 21. The output signals from the two circuits are given to the generator 18. As seen in FIG. 4, the refrigerant selecting circuit 20 comprises a movable contact piece 20A, and fixed contacts 20B to 20D, for example, for specifying refrigerants R-12 ($CCl_2F_2$, dichlorodifluoromethane), R-22 ($CHClF_2$, chlorodifluoromethane) and R-502 [a xixture of 48.8% R-12 and 51.2% R-115 ($C_2ClF_5$, Chloropentafluoroeyhane)], respectively. According to the particular kind of refrigerant to be used for ts refrigerating apparatus 1, the movable contact piece 20A is brought into contact with the fixed contact, e.g. 20C, specifying that refrigerant. The load capacity selecting circuit 21, which specifies the size, i.e. volume, of the space 6 to be cooled, comprises a movable contact piece 21A, and fixed contacts 21B and 21C, for example, for specifying the refrigeration effects of 1.0 ton and 2.0 tons per hour (ton being U.S. ton of refrigeration). The movable piece 21A is brought into contact with the fixed contact corresponding to the size of the space 6 to be cooled, for example, contact 21B when the effect of 1.0 ton hour is required of the space 6. FIG. 4 further shows interfaces I/F.

Figure 3:
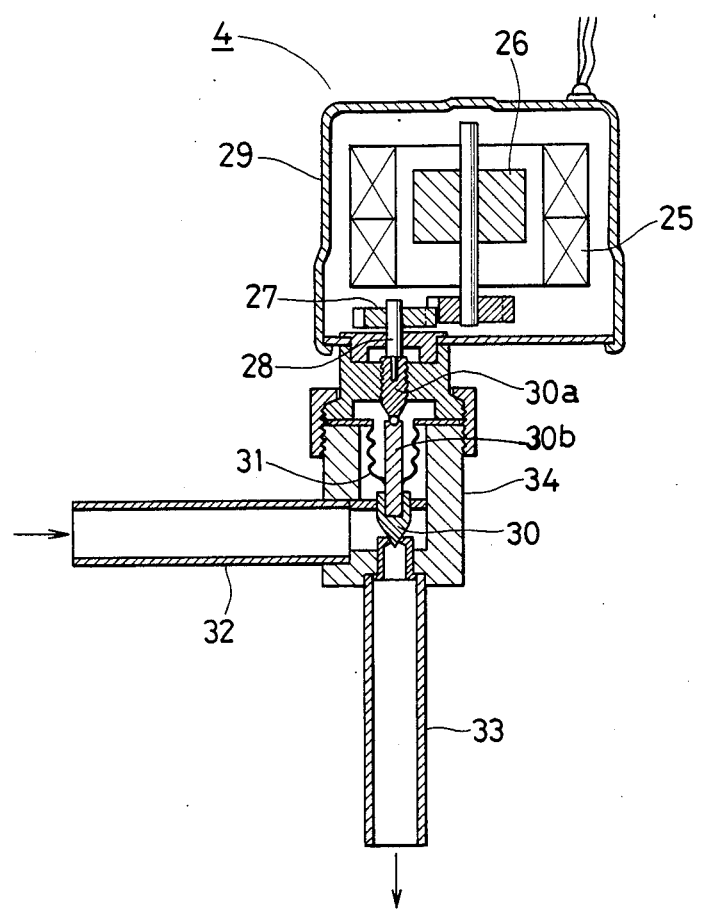
FIG. 3 is a view in vertical section showing a electronic expansion valve.

FIG. 3 shows a electronic expansion valve which is used as the valve 4 according to the invention. This valve comprises a stepping motor 29 including a coil 25, rotor 26, gear 27 and drive shaft 28; and a valve main body 34 including a screw shaft 30a vertically movable by the torque delivered from the shaft 28, valve needle 30 to be pressed by the screw shaft through a valve stem 30b, bellows 31, refrigerant inlet pipe 32 and refrigerant outlet pipe 33. The steoping motor 29 is driven by a valve opening adjusting signal (pulse signal) from the valve drive unit 11 so as to maintain a suitable degree of superheat. The torque of the stepping motor is further converted to an upward or downward movement of the screw shaft 30a to adjust the degree of opening of the valve stem 30b.

The opening-closing operation of the valve 4 will be described. With reference to FIG. 1, indicated at SHS is a preset degree of superheat, at SH a measured degree of superheat calculated from (the temperature ST at the outlet of the evaporator)—(the temperature of refrigerant at the inlet or intermediate portion of the evaporator, i.e. evaporating temperature ET), at DV a deviation signal calculated from (amount of control=SH - target value, i.e. SHS), at HSS an adjusting signal for correcting the deviation by PID (proportion, integration, differentiation) operation, at BKC a valve opening adjusting signal for giving a number of pulses to open the valve 4 by a controlled amount according to the adjusting signal, at GA a flow rate to which the refrigerant flow is controlled by the valve 4, at DT disturbances of the evaporator 5 such as a variation of the condensation pressure, temperature difference between the supply cold air A1 and return air A2 or enthalpy difference, at RS a refrigerant specifying signal, at FS a load capacity signal, and at S an initial valve opening signal for specifying the opening degree of the valve 4 when starting refrigeration cycles.

First, a descrption is given of superheat control, i.e. valve opening operation, for preventing occurrence of return of liquid refrigerant to the compressor 2, namely so-called liquid back.

It is now assumed that the preset degree of superheat SHS is 5° C. The degree of superheat SH measured by the evaporator temperature measuring unit 12 is compared with the preset degree of superheat SHS in the first comparator 9. The deviation signal DV representing the deviation of the measurement from the preset value is fed to the internal algorithmic unit 10, in which the deviation is collected, whereupon the unit 10 feeds an adjusting signal HSS to the valve drive unit 11. Based on the adjusting signal HSS, i.e. according to the deviation from the set degree SHS of 5° C., the unit 11 continuously feeds a valve opening adjusting signal BKC to the valve 4. Thus, the algorimc unit 10 removes various disturbance DT parameters and gives a converged pulse signal to the valve 4. Consequently through the mechanism of valve opening degree→area of valve opening →variation of refrigerant flow rate GA, a suitable degree of valve opening is maintained to maintain the flow rate GA and to realize the preset degree of superheat SHS, i.e. 5° C. As a result, the measured temperature $T_M$ of the space 6 to be cooled reaches the preset temperature $T_S$ (anually adjustable as desired). The operation of the valve 4 for this superheat control is conducted during the time period of $\tau_0$ to $\tau_1$ shown in FIG. 5, and the degree of valve opening is adjusted as represented by an indefinite steplike form.

Next, the control of the temperature of space 6 which is generally termed "thermocycle," i.e. valve closing operation, will be described.

Figure 5:
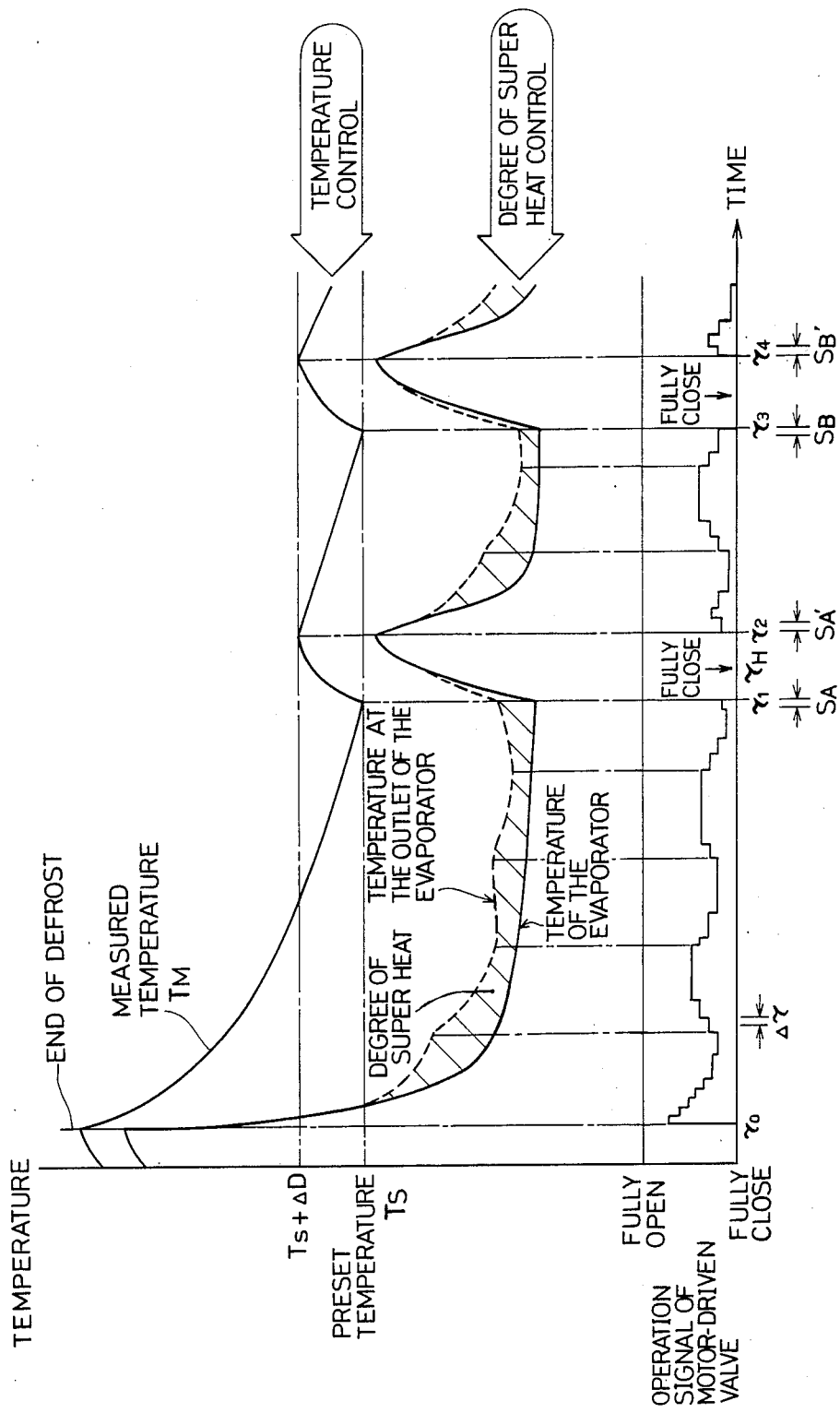
FIG. 5 is a diagram showing the operation characteristics of the valve.

With reference to FIG. 5, the measured temperature $T_M$ is calculated from the temperature of the supply cold air A1 and the return air A2 as the average thereof and is compared with the preset temperne $T_S$ in the second comparator 14. When a temperature signal of $T_M > T_S$ is produced from the second comparator, i.e. when the measured temperature $T_M$ is higher than the preset temperature $T_S$, the above-mentioned superheat control is performed. When a temperatue signal of $T_M \leq T_S$ is given, i.e. when the measured temperature $T_M$ is lower than or equal to the preset temperature $T_S$, the temperature of the space 6 is controlled.

When the measured temperature $T_M$ of the space 6 has reached the preset temperature $T_S$ at time $\tau_1$ in FIG. 5, the second comparator 14 feeds the signal $T_M \leq T_S$ to the valve full-closing signal generator 15, which feeds a valve closing signal BP to the valve drive unit 11 to fully close the valve 4 and discontinue the supply of refrigerant to the evaporator 5. The temperature control in this fully closed state continues until the temperature measurement reaches an upper limit temperature($T_S + \Delta D$) which is slightly higher than the preset temperature $T_S$, i.e. until time $\tau_2$. The value $\Delta D$ is a so-called differential. During the period of time $\tau_2$ to $\tau_3$, the valve is opened as stated above; during the time period $\tau_3$ to $\tau_4$, the valve is closed as above; and the valve opening-closing operation is thereafter repeated.

In controlling the superheat and the temperature as above, suppose the period of sampling the valve opening adjusting signal BKC (i.e. output period) is $\Delta \tau$ ($\Delta \tau = t_n - t_{n-1}$ where tn is sampling time, and $t_{n-1}$ is immediately preceding sampling time), the valve full-closing period $\tau_1$ to $\tau_2$ is $\tau_E$, and $\tau_E > \Delta \tau$. The control data $Y_n$ for the valve opening adjusting signal BKB at time $t_n$ is then given by:

$$Y_n = Y_{n-1} + (D_n - D_{n-1}) \quad (1)$$
$$\text{or } Y_n = Y_{n-1} + D_n \quad (2)$$

In Eq. (1) and (2), D is an amount of correction for the deviation and is processed by the algorismic unit 10.

Accordingly, the control data $Y_n$ becomes a converged reference value free of the above-mentioned various disturbance (DT) parameters. During $\tau_E$, $Y_n = C$ (where C is a constant totally irrelevant to $Y_{n-1}$).

It is assumed that the control data $Y_n$ at time $\tau_1 - \Delta \tau$ for the valve opening adjusting signal BKC in the control of superheat, i.e. valve opening operation, is $S_A$. The control data is a converged value obtained by removing the disturbances DT occurring during the time period of $\tau_0$ to $\tau_1$ and is stored in the algorithmic unit 10. The control data $Y_n = S_A$ is retrieved at time $\tau_2$ for the subsequent control of superheat and may be given as control data $Y_n = S_A$ for the opening adjusting signal BKC as it is to the valve 4. Alternatively, the data may be given as $Y_n = S_A - \delta = S'_A$ (where $\delta$ is an amount of transient correction for a rise). The same is true of control data $Y_n = S_B$, $Y_n = S'_B$ at time $\tau_3$, $\tau_4$.

The full-closing operation of the valve 4 during duty cycles is the same as that described above for temperature control, but in this case, the temperature differential is not resorted to but the control is effected by forcibly interrupting the operation of the valve 4 for a given period of time. Stated more specifically, upon lapse of a period of time after completion of defrosting (i.e. start of super heat control), that is after time $\tau_0$, a timer T delivers an output signal to the valve full-closing signal generator 15, which in turn emits a valve closing signal BP based on the output signal, whereby the valve 4 can be held fully closed independently of the temperature.

Bernoulli's theorem and theorem of continuity indicate that in controlling the valve 4, the volume flow rate GR(V) varies when the density $\sigma$ and pressure difference $\Delta P$ of the refrigerant (fluid) alter even if the degree of opening, i.e. area of opening, of the valve 4 remains unchanged, as represented by the following expression.

$$GR(V) \propto \sqrt{\Delta P/\rho} \quad (3)$$

The expression (3) shows that the volume flow rate is in proportion to the square root of the ratio of the pressure difference $\Delta P$ to the density $\rho$.

In the refrigerating apparatus 1, the pressure difference $\Delta P$ is given by:

Pressure difference $\Delta P$ = condensing pressure Pd – evaporating pressure $P_E$ The condensing pressure Pd, which has a close relationship with the condensing temperature, is not dependent on the type of the condenser 2 (air-cooled or water-cooled) of the apparatus 1 but is influenced by the temperature of outside air. With refrigerant R-22, for example, the pressure changes from 20 atg to 7 atg during the period of from summer to winter.

Further the condensing pressure P physically differs for different refrigerants even at the same condensing temperature, for example, as shown in the table below wherein the condensing temperature is 40° C.

| Refrigerant | R-12 | R-22 | R-502 |
|---|---|---|---|
| Pd (kg/cm$^2$) | 8.8 atg | 14.6 atg | 16.1 atg (saturation) |

Similarly the evaporating pressure $P_E$ and the pressure difference $\Delta P$ are as follows when the evaporating temperature is $-5°$ C.

| Refrigerant | R-12 | R-22 | R-502 | |
|---|---|---|---|---|
| $P_E$ (kg/cm$^2$) | 1.7 | 3.3 | 4.0 (saturation) | |
| $\Delta P = Pd - P_E$ | 7.1 | 11.3 | 12.1 | (4) |

Next, the refrigeration effect $Q_S$ is given by the following equation.

$$Q_S = \{(G_E(V) \times \sigma\} \times (\bar{ho} - /hi) \quad (5)$$

In Eq. (5), $\rho$ is density, $\bar{ho}$ is the enthalpy possessed by the refrigerant at the outlet of the evaporator 5, and hi is the enthalpy possessed by the refrigeratnt at the inlet of the evaporator 5.

The valve opening area ratios determined from the relations of Eq. (3) to (5) for different refrigerants are as follows provided that the refrigeration effect, condensing temperature and evaporating temperatures are the same for the different refrigerants.

| Refrigerant | R-12 | R-22 | R-502 |
|---|---|---|---|
| Opening area | $A_{12}$ | $A_{22}$ | $A_{502}$ |
| Opening area ratio | 1 | $\eta_1$ | $\eta_2$ | wherein $\eta_1 = A_{22}/A_{12}$, and $\eta_2 = A_{502}/A_{12}$. The opening areas are in the relation of $A_{12} > A_{502} > A_{22}$, and the ratios are such that $0 < \rho_1 < \rho_2 < 1$. This indicates that the opening area required for reducing the pressure of the refrigerant (liquid refrigerant) differs for different refrigerants even under the same conditions. When the opening area ratio for R-12 is 1 as listed above, the opening area ratios for R-22 and R-502 are $\eta_1 = 0.6$ and $\rho_2 = 0.8$, respectively. Accordingly, for example when refrigerant R-22 is enclosed in the refrigerating apparatus 1, there is a need to preset the movable contact piece 20A to the fixed contact 20C on the refrigerant selecting circuit 20.

In the control of electronic expansion values of the type described, the flow rate characteristics are in rectilinear relation with the number of pulses applied if the pressure difference $\Delta P$ is constant (see Published Unexamined Japanese patent application No. SHO 60-98276, FIG. 6). Accordingly to meet a change in the opening area of the valve 4 due to a variation in the size of the space 6 to be cooled, it is necessary to preset the movable piece 21A of the load capacity selecting circuit 21, for example, to the fixed contact 21B in conformity with the size of the space 6, that is, to set the opening area to a large value for a great load or to a small value for a small load.

Thus, before the refrigerating apparatus 1 is initiated into (the first cycle of) refrigeration operation, the selector 19 serves to specify a particular opening area for the contemplated refrigerant the kind of which is a first paremeter and a particular opening area that is variable with the load capacity which is a second parameter, permitting the signal generator 18 to set an initial degree of valve opening suited to the refrigerant to be used and the space 6 to be cooled.

When the first and second parameters can not be specified, and when the valve 4 is opened to a smaller area; a reduced evaporatin temperature ET and attendant lowered evaporating pressure will result, causing a lower presure switch to function (to cut the low pressure) to stop the compressor 2. When the compressor then resumes its operation, an increased degree of superheat SH causes a rise in the temperature of low-pressure refrigerant gas returning to the compressor 2, possibly entailing a lower pressure cut again to impair the durability of the compressor 2 and resulting in a prolonged pull-down time (period of time taken for cooling the cold storage to the set temperature after the start or resumption of evaporator operation) without producing the desired cooling effect. Further if the valve 4 is opened to a larger area, a lower degree of superheat SH could result to permit liquid refrigerant to become mixed with the lowpressure refrigerant gas returning to the compressor 2. Such liquid back impairs the durability of the compressor 2 and also results in a lower refrigeration effect. Further if the valve 4 is initially set to a fixed degree of opening, the constant of PID operation for removing the influence of disturbances DT becomes large, necessitating a longer period of time for correcting the deviation.

According to the present invention, therefore, the refrigerant specifying signal RS from the refrigerant selecting circuit 20 and the load capacity signal FS from the load capacity selecting circuit 21 are given to the initial valve opening signal generator 18, in which the refrigerant in use and the load capacity are judged, whereupon an initial valve opening degree signal S is fed to the valve drive unit 11. Consequently, the valve 4 can be set to an initial degree of opening suited to the kind of refrigerant and the value of load capacity. The signal S is of course combined in the valve drive unit 11 with the adjusting signal HSS which has been deviation-corrected in the internal algorithmic unit 10, so that the unit 11 delivers a variable signal. The initial degree of opening of the valve 4 is therefore different at time $\tau_0$, $\tau_2$ and $\tau_4$ in FIG. 5.

For example, the refrigerant selecting circuit 20 gives the valve 4 an initial opening area the same as the above, as listed below

| Identified refrigerant | R-12 | R-22 | R-502 |
|---|---|---|---|
| Initial opening area | $A(I)_{12}$ | $A(I)_{22}$ | $A(I)_{502}$ |
| Initial opening area ratio | 1 | $\eta_1$ | $\eta_2$ |

The load capacity selecting circuit 21 provides a capacity signal FS for giving a large opening area for a great load or a small opening area for a small load.

More specifically, FIGS. 6 (a) and (b) show an initial valve opening degree signal S-1 for the combination of refrigerant R-22 and a load capacity of 2.0 tons, and an initial valve opening degree signal S-2 for the combination of R-22 and a capacity of 1.0 ton. FIG. 6 (c) shows the controller 8 in energized state.

With the system described above, the degree of superheat SH obtained by the evaporator temperature measuring unit 12 is compared with a preset degree of superheat SHS in the first comparator 9 to obtain a deviation signal DV, and the deviation is corrected by the internal algorithmic unit 10 to obtain an adjusting signal HSS. This adjusting signal is fed to the valve drive unit 11, whereupon the unit 11 produces a valve opening adjusting signal BKC to open the valve 4. This assures superheat control in accordance with the deviation of the superheat measurement from the preset degree SHS. A converged pulse signal which is free of the influences of disturbances DT is continuously given to the valve 4 to determine the degree of valve opening according to the pulse signal and to assure stable control of the superheat. Further the temperature $T_M$ measured by the cooled space temperature measuring unit 13 is compared with a preset temperature $T_S$ in the second comparator 14, and when $T_M \leq T_S$, the valve full-closing signal generator 15 feeds a valve full-closing signal BP to the valve drive unit 11 to close the valve 4. This prevents excessive cooling of the space 6 for temperature control. The temperature control can be effected also by the same valve 4 independently of superheat control.

Further in the control of superheat, control data $Y_n = S_A$ which is converged and exclusive of the influence of disturbances DT is stored in the algorithmic unit 10 and is used as a reference valve when resuming superheat control. This assures smooth superheat control during the transient rise period when resuming the control, ensuring effective use of the evaporator.

The refrigerant specifying signal RS from the refrigerant selecting circuit 20 and the load capacity signal FS from the load capacity selecting circuit 21 are fed to the initial valve opening signal generator 18, wherepon the generator 18 gives an initial valve opening degree signal S to the valve drive unit 11. The valve 4 can therefore be set to an initial opening degree in conformity with the kind of refrigerant and the value of load capacity before the refrigerating apparatus is initiated into operation. Further because the signal S is combined in the valve drive unit 11 with the adjusting signal HSS which is deviation-corrected by the algorithmic unit 10 for superheat control, an appropriate valve opening degree can be maintained for initiating the apparatus into operation. This gives a wider range of control to the valve 4, while even if the controller 8 is temporarily de-energized owing to a power failure or the like, the valve 4 is smoothly operable subsequently when the controller 8 is energized.

The present system, which has the foregoing construction, is featured by the following advantages.

(1) The electronic expansion valve is used for both superheat control and temperature control, so that the control mode can be changed over with improved control characteristics, assuring superheat control and temperature control with good stability.

(2) For superheat control, a pulse signal according to the deviation of the measurement from the preset degree of superheat is continuously fed to the valve drive unit. This assures the valve of smooth opening adjustment to effect control free of the influence of disturbances.

(3) For temperature control, a value obtained by comparing the temperature measurement with the preset temperature is used as a reference, and the valve is fully closed independently of superheat control. This eliminates leaks from the valve.

(4) Control data which is exclusive of the influence of disturbances is stored in the internal algorithmic unit and is used as a reference value subsequently for superheat control, with the result that the superheat is smoothly controllable during the transient rise period, enabling the evaporator to achieve improved EER (refrigeration capacity/power consumption).

(5) A plurality of refrigerants and different load capacities are preset by the selector, and the initial valve opening signal generator gives the valve drive unit an intial valve opening degree signal conforming to the refrigerant to be used and the contemplated load capacity. Accordingly, the valve can be maintained at an appropriate degree of opening during the initial refrigeration operation for a wider range of control.

(6) Because the initial valve opening degree signal is combined with the adjusting signal by the valve drive unit, the initial valve opening degree is variable for every instance of superheat control, rendering the flow rate of refrigerant smoothly controllable.

What is claimed is:

1. A system for controlling the flow rate of a refrigerant for use in refrigeration cycles comprising an electronic expansion valve provided at the inlet of an evaporator, and a controller for controlling the opening-closing movement of the valve, the controller comprising i) a valve drive unit for opening or closing the valve, ii) a unit for measuring the degree of superheat of the evaporator, iii) a unit for measuring the temperature of the space to be cboled by the evaporator, iv) calculating means for feeding a valve opening adjusting signal to the valve drive unit in accordance with a value obtained by comparing the measured degree of superheat given by the superheat measuring unit with a preset degree of superheat, v) a valve full-closing signal generator for feeding to the valve drive unit a valve full-closing signal in preference to the valve opening adjusting signal, whenever the temperature measured by the temperature measuring unit is lower than or equal to a preset temperature against which the measured temperature is compared, and vi) an initial valve opening setting unit including a refrigerant selecting circuit for selecting a particular kind of refrigerant for use in refrigeration cycles, and an initial valve opening signal generator for feeding an initial valve opening signal present for the selected refrigerant to the valve drive unit in accordance with a signal from the circuit.

2. A system as defined in claim 1 wherein the calculating means comprises a first comparator for comparing the measured degree of superheat with the preset degree of super hear to produce a signal representing the deviation of the measurement from the preset degree, and an internal algorithmic unit for both (1) correcting the deviation represented by the signal in order to exclude the influence of distrubances, and (2) feeding the valve opening adjusting signal to the valve drive unit in accordance with the resulting correction signal.

3. A system as defined in claim 1, wherein the calculating means comprises a first comparator for comparing the measured degree of superheat with the present degree of superheat to produce a signal representing the deviation of the measurement from the preset degree of superheat, and an internal algorithic unit for both (1) correcting the deviation represented by the signal in order to exclude the influence of disturbances, and (2) feeding the valve opening adjusting signal to the valve drive unit in accordance with the resulting correction signal, and the initial valve opening signal is used as a reference value control data excluding the influence of disturbances, converged and stored in the internal algorithmic unit.

4. A system as defined in claim 1, wherein the initial valve opening setting unit further includes a load capacity selecting circuit for selecting the size of the space to be cooled, and said initial valve opening signal generator being responsive to said selecting circuit for adjusting the initial valve opening signal to produce the desired cooling effect corresponding to the selected load capacity, and to the selected refrigerant.

5. A system as defined in claim 1, wherein the initial valve opening setting unit further comprises a load capacity selecting circuit for selecting the size of the space to be cooled.

6. A system as defined in claim 1, wherein the initial valve opening setting unit further comprises a load capacity selecting circuit for selecting the size of the space to be cooled, and the calculating means comprises a first comparator for comparing the measured degree of superheat with the preset degree of superheat to produce a signal representing the deviation of the measurement from the preset degree of superheat, and an internal algorithmic unit for both (1) correcting the deviation represented by the signal in order to exclude the influence of disturbances, and (2) feeding the valve opening adjusting signal to the valve drive unit in accordance with the resulting correction signal, and the initial valve opening signal is used as a reference value control data excluding the influence of disturbances, coverged and stored in the internal algorithmic unit.

* * * * *